United States Patent
Lee et al.

(10) Patent No.: US 8,553,968 B1
(45) Date of Patent: Oct. 8, 2013

(54) USING OPTICAL CHARACTER RECOGNITION AUGMENTED BY AN ERROR CORRECTION CODE TO DETECT SERIAL NUMBERS WRITTEN ON A WAFER

(75) Inventors: Patrick J. Lee, Foothill Ranch, CA (US); Robert E. Caddy, Jr., San Clemente, CA (US); Mark D. Thomas, Hollister, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 2163 days.

(21) Appl. No.: 11/060,901

(22) Filed: Feb. 18, 2005

(51) Int. Cl.
*G06K 9/00* (2006.01)

(52) U.S. Cl.
USPC .............. 382/141; 382/220; 382/309

(58) Field of Classification Search
USPC ........................................... 382/141
See application file for complete search history.

(56) References Cited

U.S. PATENT DOCUMENTS

| | | | |
|---|---|---|---|
| 4,105,997 A | | 8/1978 | McGinn |
| 5,412,194 A | | 5/1995 | Melbye et al. |
| 5,418,864 A | * | 5/1995 | Murdock et al. .............. 382/309 |
| 5,455,875 A | | 10/1995 | Chevion et al. |
| 5,625,721 A | | 4/1997 | Lopresti et al. |
| 5,701,314 A | | 12/1997 | Armstrong et al. |
| 5,703,972 A | | 12/1997 | Lopresti et al. |
| 5,912,986 A | | 6/1999 | Shustorovich |
| 6,047,093 A | | 4/2000 | Lopresti et al. |
| 6,347,389 B1 | | 2/2002 | Boyer |
| 6,351,574 B1 | | 2/2002 | Yair et al. |
| 6,628,837 B1 | | 9/2003 | Greene et al. |
| 6,722,565 B2 | * | 4/2004 | Takeuchi et al. .............. 235/454 |
| 6,768,560 B1 | | 7/2004 | Greene et al. |
| 7,470,315 B2 | * | 12/2008 | Vonwiller et al. .......... 106/31.49 |
| 2003/0009725 A1 | * | 1/2003 | Reichenbach ................ 714/804 |

OTHER PUBLICATIONS

S. S. Shah, et al., "Self-Correcting Codes Conquer Noise Part 2: Reed-Solomon Codecs", EDN Magazine, pp. 107-120, Mar. 15, 2001.

Y. S. Han, "Efficient Soft-Decision Decoding Algorithms for Linear Block Codes Using Algorithm A", pp. 7-19, Thesis, Graduate School of Syracuse University, Aug. 1993.

David Chase, "A Class of Algorithms for Decoding Block Codes With Channel Measurement Information", IEEE Transactions on Information Theory, vol. IT-18, No. 1, pp. 170-182, Jan. 1972.

Jack K. Wolf, "Efficient Maximum Likelihood Decoding of Linear Block Codes", IEEE Transactions on Information Theory, vol. IT-24, No. 1, pp. 76-80, Jan. 1978.

* cited by examiner

*Primary Examiner* — Hadi Akhavannik

(57) ABSTRACT

A serial number detector is disclosed for detecting an encoded serial number written on a wafer. A scanner scans the wafer to generate a raster image representing the encoded serial number, and an optical character recognition (OCR) system detects a detected serial number comprising a plurality of detected data characters and a plurality of detected redundancy characters. A character-to-binary converter converts the detected data characters and the detected redundancy characters into codeword symbols. A syndrome generator generates a plurality of error syndromes in response to the codeword symbols, and an error corrector, responsive to the error syndromes, detects and corrects errors in the codeword symbols.

6 Claims, 7 Drawing Sheets

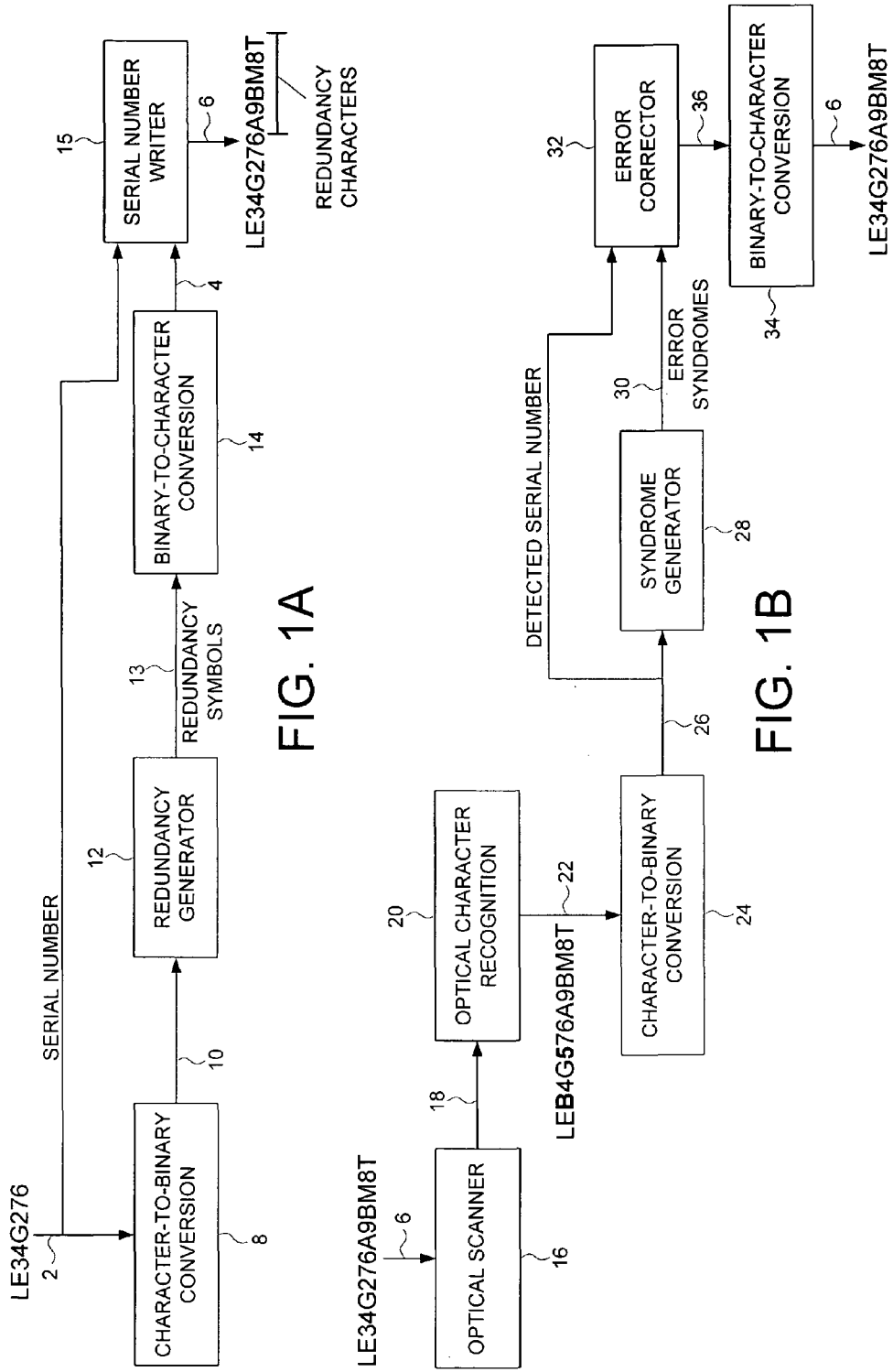

USING OPTICAL CHARACTER RECOGNITION AUGMENTED BY AN ERROR CORRECTION CODE TO DETECT SERIAL NUMBERS WRITTEN ON A WAFER

BACKGROUND OF THE INVENTION

1. Field of the Invention

The present invention relates to detecting serial numbers written on a wafer, for example, serial numbers that identify disk drive heads. More particularly, the present invention relates to using optical character recognition augmented by an error correction code to detect serial numbers written on a wafer.

2. Description of the Prior Art

Microelectronic components, such as microchips and heads employed in disk drives, are typically fabricated on a slice of semiconductor material or ceramic substrate. To enable tracing and quality control of the fabricated components, serial numbers are typically written on the wafers to identify a wafer as a whole, a region of a wafer, as well as each individual component fabricated on the wafer. The serial number is typically written using a human readable code, such as alphanumeric characters, to facilitate identification with visual inspection, but it is also desirable to read the serial numbers using automated machines employing optical character recognition (OCR).

Conventional OCR systems comprise a scanner for scanning the written alphanumeric characters to generate a raster (bit map) representation for each character. The raster image is converted into a detected character by identifying and correlating features of the raster image with expected features corresponding to possible output characters. A confidence metric is generated for each possible output character, and the character having the highest confidence metric is selected as the detected character. This process is susceptible to errors due to imperfections (noise) in the character writing process, as well as the character scanning process. An OCR system may generate an alarm if the confidence metric for a particular character falls below a predetermined threshold, requiring human intervention to verify the accuracy of the detected character through visual inspection.

U.S. Pat. No. 4,105,997 discloses another technique for detecting an error in the characters output by an OCR system by including redundancy characters with the written data characters. The redundancy characters are generated from an error detection code, such as a Fire code, wherein the data characters and appended redundancy characters form an error detection codeword. The redundancy characters are used to decode the detected codewords output by the OCR system in order to detect errors in the data characters. If an error is detected, the OCR system repeatedly rescans the text and decodes the detected codeword until the redundancy characters indicate the data characters are error free. If the error persists, the automated OCR system is aborted and the text image is processed in some alternative manner, such as a human operator performing the translation through visual inspection.

It is undesirable to require human intervention whenever the confidence of the OCR system falls below a threshold or when redundancy characters indicate an error, particularly when processing hundreds of thousands of components fabricated on wafers. There is, therefore, a need to improve the OCR system used to detect serial numbers written on wafers.

SUMMARY OF THE INVENTION

The present invention may be regarded as a serial number detector for detecting an encoded serial number written on a wafer, wherein the encoded serial number comprises a plurality of data characters and a plurality of redundancy characters. A scanner scans the wafer to generate a raster image representing the encoded serial number. An optical character recognition (OCR) system executes an OCR algorithm in response to the raster image to detect a detected serial number comprising a plurality of detected data characters and a plurality of detected redundancy characters. A character-to-binary converter converts the detected data characters and the detected redundancy characters into codeword symbols. A syndrome generator generates a plurality of error syndromes in response to the codeword symbols, and an error corrector, responsive to the error syndromes, detects and corrects errors in the codeword symbols. A binary-to-character converter converts the corrected codeword into at least the data characters of the encoded serial number.

In one embodiment, the OCR system generates a confidence metric for each detected character, and an erasure pointer is generated for one of the detected characters if the corresponding confidence metric is less than a predetermined threshold. The syndrome generator generates modified error syndromes in response to the codeword symbols and the erasure pointers, and the error corrector processes the erasure pointers and the modified error syndromes to detect and correct errors in the codeword symbols. In one embodiment, the OCR system comprises a neural network having a plurality of input processing elements, a plurality of hidden processing elements, and a plurality of output processing elements, wherein each output processing element generates the confidence metric for a corresponding possible output character.

In another embodiment, the redundancy characters and error syndromes (and modified error syndromes) are generated according to a Reed-Solomon error correction code.

In yet another embodiment, the codeword symbols represent a plurality of codewords, the syndrome generator generates a plurality of error syndromes for each of the codewords, and the error corrector detects and corrects errors in each codeword in response to the corresponding error syndromes.

The present invention may also be regarded as a method of detecting an encoded serial number written on a wafer, the encoded serial number comprising a plurality of data characters and a plurality of redundancy characters. The wafer is scanned to generate a raster image representing the encoded serial number. An OCR algorithm is executed in response to the raster image to detect a detected serial number comprising a plurality of detected data characters and a plurality of detected redundancy characters. The detected data characters and the detected redundancy characters are converted into codeword symbols. A plurality of error syndromes are generated in response to the codeword symbols, wherein errors in the codeword symbols are detected and corrected in response to the error syndromes. The corrected codeword is converted into at least the data characters of the encoded serial number.

The present invention may also be regarded as a serial number detector for detecting an encoded serial number written on a wafer, the encoded serial number comprising a plurality of data characters and a plurality of redundancy characters. A scanner scans the wafer to generate a raster image representing the encoded serial number. An optical character recognition (OCR) system executes an OCR algorithm in response to the raster image to detect a detected serial number comprising a plurality of detected data characters and a plurality of detected redundancy characters, wherein the OCR system outputs a confidence metric for each detected character in the detected serial number. A character-to-binary converter converts the detected data characters and the detected redundancy characters into codeword symbols. A soft-decision decoder, responsive to the confidence metrics, corrects errors in the codeword symbols. A binary-to-character converter converts the corrected codeword into at least the data characters of the encoded serial number.

The present invention may also be regarded as a method of detecting an encoded serial number written on a wafer, the encoded serial number comprising a plurality of data characters and a plurality of redundancy characters. The wafer is scanned to generate a raster image representing the encoded serial number. An OCR algorithm is executed in response to the raster image to detect a detected serial number comprising a plurality of detected data characters and a plurality of detected redundancy characters, wherein the OCR algorithm outputs a confidence metric for each detected character in the detected serial number. The detected data characters and the detected redundancy characters are converted into codeword symbols. Errors in the codeword symbols are corrected in response to the confidence metrics. The corrected codeword is converted into at least the data characters of the encoded serial number.

BRIEF DESCRIPTION OF THE DRAWINGS

FIG. 1A shows an embodiment of the present invention for encoding a serial number to generate appended redundancy symbols that form an encoded serial number written to a wafer.

FIG. 1B shows an embodiment of the present invention for scanning a wafer, detecting the encoded serial number using an OCR system, and generating error syndromes for detecting and correcting errors in the detected serial number.

DESCRIPTION OF THE PREFERRED EMBODIMENTS

Figure 1C:
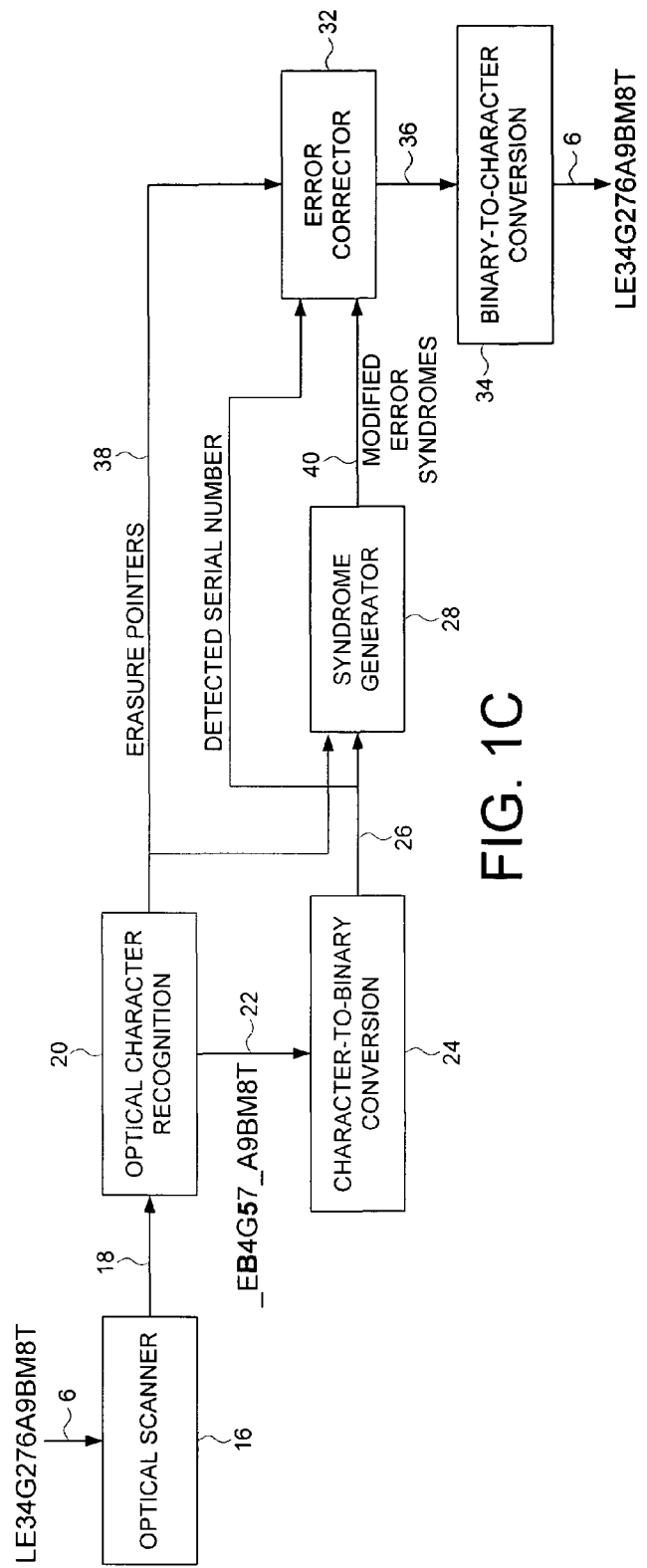
FIG. 1C shows an embodiment of the present invention wherein the OCR system generates erasure pointers used to augment the error detection and correction process.

FIG. 1A shows an embodiment of the present invention for encoding a serial number 2 to generate appended redundancy characters 4 that form an encoded serial number 6 written to a wafer. In this example, the characters of the serial number 2 are selected from upper case letters A-Z and the digits 0-9. A character-to-binary converter 8 converts the characters of the serial number 2 into binary codeword symbols 10 that are processed by a redundancy generator 12 to generate redundancy symbols 13. A binary-to-character converter 14 converts the redundancy symbols 13 into the redundancy characters 4 that are appended to the data characters of the serial number 2 to form the encoded serial number 6 which is written to the wafer by a serial number writer 15. In the example of FIG. 1A, the encoded serial number 6 comprises data characters (LE34G276) and appended redundancy characters (A9BM8T). In one embodiment, the serial number writer 15 employs a number of masks for writing the encoded serial number to the wafer, wherein the masks are pre-fabricated to include the data characters of the serial number and the corresponding redundancy characters.

FIG. 1B shows a serial number detector according to an embodiment of the present invention for detecting an encoded serial number 6 written on a wafer. A scanner 16 scans the wafer to generate a raster image 18 representing the encoded serial number 6. An optical character recognition (OCR) system 20 executes an OCR algorithm in response to the raster image 18 to detect a detected serial number 22 comprising a plurality of detected data characters and a plurality of detected redundancy characters. In the example shown, the detected serial number 22 comprises two errors (the $3^{rd}$ and $6^{th}$ characters) due to misdetections made by the OCR system 20. A character-to-binary converter 24 converts the detected data characters and the detected redundancy characters into codeword symbols 26. A syndrome generator 28 generates a plurality of error syndromes 30 in response to the codeword symbols 26, and an error corrector 32, responsive to the error syndromes 30, detects and corrects errors in the codeword symbols 26. A binary-to-character converter 34 converts the corrected codeword 36 into at least the data characters of the encoded serial number 6.

FIG. 1C shows an embodiment of the present invention wherein the OCR system 20 generates erasure pointers 38 used to augment the error detection and correction process. In one embodiment, the OCR system 20 generates a confidence metric for each detected character, and an erasure pointer 38 is generated for one of the detected characters if the corresponding confidence metric is less than a predetermined threshold. The syndrome generator 28 generates modified error syndromes 40 in response to the codeword symbols 26 and the erasure pointers 38, and the error corrector 32 processes the erasure pointers 38 and the modified error syndromes 40 to detect and correct errors in the codeword symbols 26.

Any suitable error correction code may be employed in the embodiments of the present invention for generating the redundancy symbols 13 during the encoding process and the error syndromes 30 (and modified error syndromes 40) during the decoding process. In one embodiment, a Reed-Solomon error correction code is used to generated the redundancy symbols 13 and error syndromes 30 (and modified error syndromes 40). A Reed-Solomon code is a linear block code which encodes data symbols (in this case characters) into a codeword comprising the data symbols and appended redundancy symbols. The codeword symbols are selected from a Galois field $GF(2^m)$, wherein in this example there are 36 symbols (A-Z and 0-9) which requires 6 bits corresponding to a field of $GF(2^6)$. A Reed-Solomon (n,k) code encodes k input symbols into a codeword comprising n symbols, wherein the correction power of the code is $n-k=2t$ where t is the number of symbols per codeword that can be corrected. In the example of FIG. 1A, the encoded serial number comprises n=14 symbols of which k=8 are input symbols (data characters) such that the correction power of the code is 3 symbols per codeword.

Figure 2:
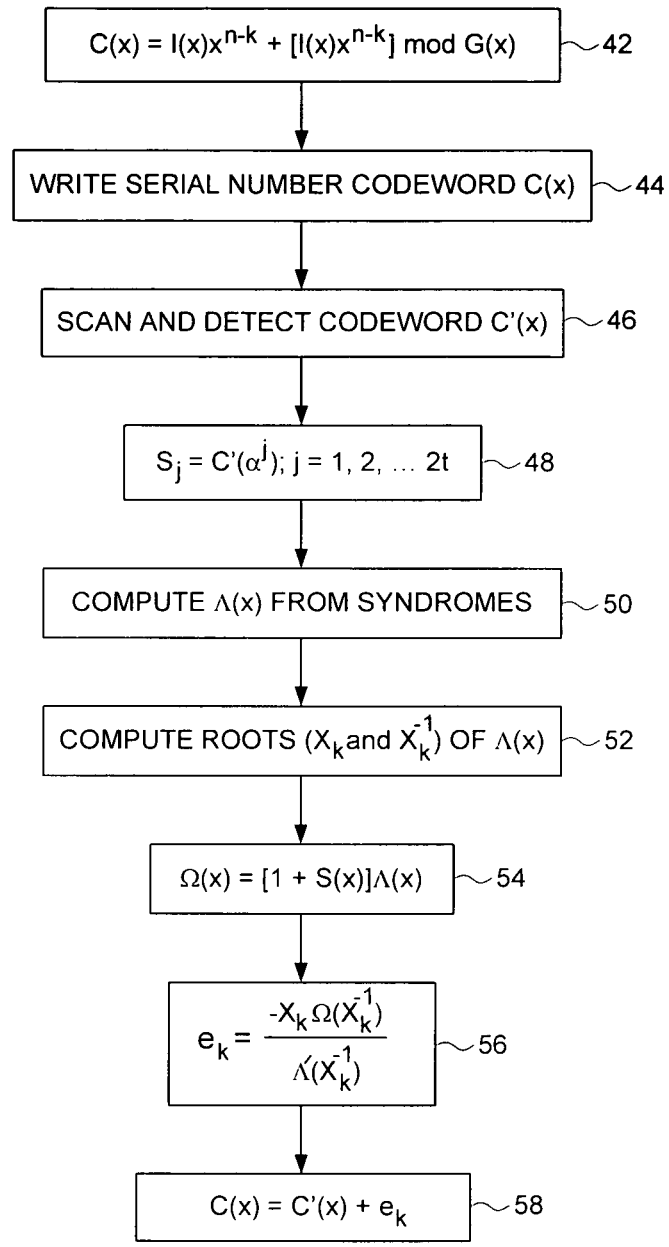
FIG. 2 is a flow diagram according to an embodiment of the invention for encoding a serial number and detecting and correcting errors in the detected serial number using a Reed-Solomon error correction code.

FIG. 2 is a flow diagram according to an embodiment of the invention for encoding a serial number and detecting and correcting errors in the detected serial number using a Reed-Solomon error correction code. At step 42 a serial number represented as an input polynomial I(x) is encoded into a codeword represented as an output polynomial C(x) by appending redundancy symbols computed by dividing the input polynomial I(x) (multiplied by $x^{n-k}$) by a suitable generator polynomial G(x). The coefficients of the codeword polynomial C(x) represent the encoded serial number written to the wafer at step 44. At step 46 the encoded serial number written on the wafer is scanned and the resulting raster image processed by the OCR system 20 to generate a detected codeword C'(x) having coefficients of which represent a detected serial number. The detected codeword C'(x) comprises one or more errors which are detected by generating error syndromes $S_j$. Each error syndrome $S_j$ is generated at step 48 by evaluating the detected codeword polynomial C'(x) at the roots c of the generator polynomial G(x). At step 50 an error locator polynomial Λ(x) is generated from the error syndromes $S_j$ using, for example, the Berlekamp-Massey algorithm. At step 52 the roots of the error locator polynomial Λ(x) are computed to find the error locations ($X_k$ and $X_k^{-1}$). At step 54 an error magnitude polynomial Ω(x) is generated in response to the error syndromes $S_j$ and the error locator polynomial Λ(x), and at step 56 the error magnitudes $e_k$ are computed. At step 58 the detected codeword C'(x) is corrected using the error magnitudes $e_k$ to generated the corrected codeword C(x) the coefficients of which represent the encoded serial number.

Figure 3:
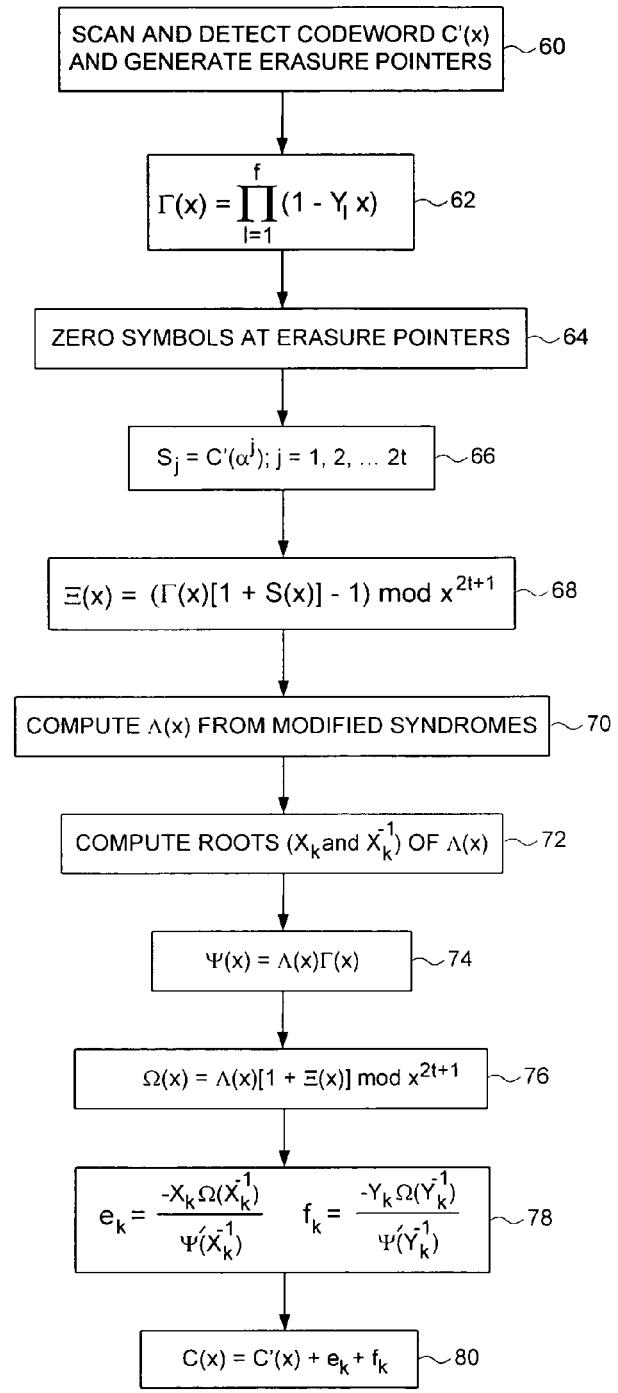
FIG. 3 is a flow diagram according to an embodiment of the invention for detecting and correcting errors in the detected serial number using a Reed-Solomon error correction code augmented by erasure pointers generated by the OCR system.

FIG. 3 is a flow diagram according to an embodiment of the invention for detecting and correcting errors in the detected serial number using a Reed-Solomon error correction code augmented by erasure pointers 38 generated by the OCR system 20 (FIG. 1C). At step 60 the encoded serial number written on the wafer is scanned and the resulting raster image processed by the OCR system 20 to generate a detected codeword C'(x) having coefficients of which represent a detected serial number. The OCR system 20 also generates an erasure pointer for any character having a confidence metric that falls below a predetermined threshold, that is, a character having a high probability of being misdetected. At step 62 an erasure locator polynomial Γ(x) is generated in response to the erasure pointers $Y_1$, and at step 64 the symbols of the received codeword C'(x) corresponding to the erasure pointers are zeroed. At step 66 the error syndromes $S_j$ are generated by evaluating the detected codeword polynomial C'(x) at the roots $α^j$ of the generator polynomial G(x). At step 68 a modified error syndrome polynomial Ξ(x) is computed in response to the erasure locator polynomial δ(x) and the error syndrome polynomial S(x). At step 70 the error locator polynomial Λ(x) is generated in response to the modified error syndromes using, for example, the Berlekamp-Massey algorithm. At step 72 the roots of the error locator polynomial Λ(x) are computed to find the error locations ($X_k$ and $X_k^{-1}$). At step 74 an erasure polynomial Ψ(x) is computed in response to the error locator polynomial Λ(x) and the erasure locator polynomial Γ(x). At step 76 the error magnitude polynomial Ω(x) is generated from the modified error syndrome polynomial Ξ(x) and the error locator polynomial Λ(x), and at step 78 the error magnitudes $e_k$ and erasure magnitudes $f_k$ are computed. At step 80 the detected codeword C'(x) is corrected using the error magnitudes $e_k$ and the erasure magnitudes $f_k$ to generated the corrected codeword C(x) the coefficients of which represent the encoded serial number.

Figures 4A, 4B:
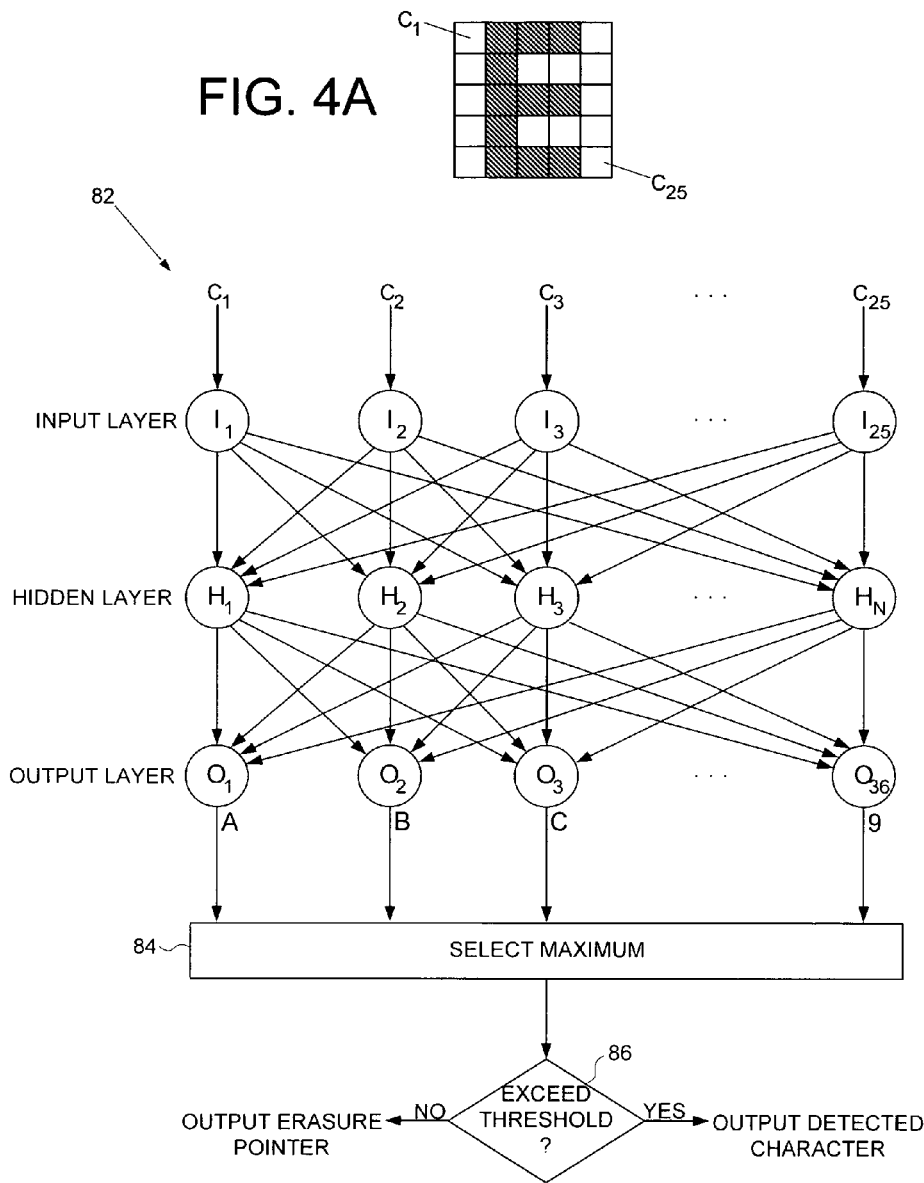
FIG. 4A shows a raster image representing the character "E" in a serial number written on a wafer.
FIG. 4B shows an embodiment of the present invention employing a neural network for implementing the OCR system, wherein the confidence metric for selecting the output character is compared to a threshold to generate an erasure pointer.

Any suitable OCR system 20 may be employed in the embodiments of the present invention, and the erasure pointers 38 may be generated in the embodiment of FIG. 1C in any suitable manner. FIGS. 4A and 4B illustrate an example OCR system 20 implemented using a neural network 82 comprising an input layer, a hidden layer, and an output layer. Each layer comprises a number of processing elements which are interconnected between the layers to form a directed graph. Each processing element implements any suitable function on the inputs, such as summing the inputs scaled by a respective weight. Each processing element of the input layer receives a bit cell representing a bit of the raster image generated by scanning the wafer. Each processing element of the output layer corresponds to one of the possible characters of a detected serial number. Each processing element of the output layer outputs a confidence metric representing the probability that the raster image represents the corresponding character, wherein a selector 84 selects the maximum confidence metric as the detected output character. If at step 86 of FIG. 4B the maximum confidence metric exceeds a predetermined threshold, then the OCR system 20 outputs the corresponding detected character. If the maximum confidence metric is less than the predetermined threshold, the OCR system 20 outputs an erasure pointer.

Figure 5A:
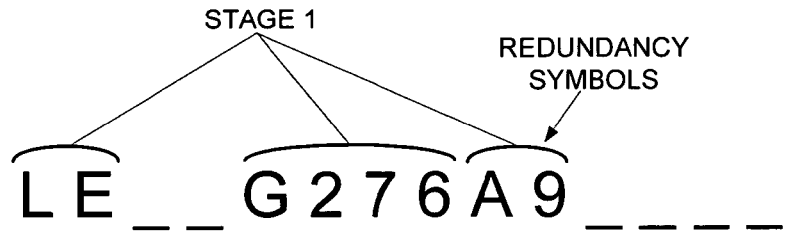
FIGS. 5A-5C illustrate an embodiment of the present invention wherein the serial number is written to the wafer as multiple codewords over a plurality of stages.
Figure 5B:
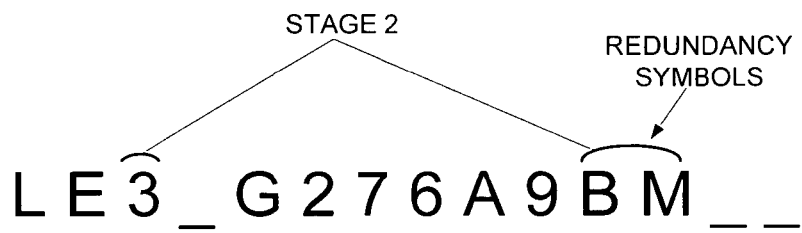
Figure 5C:
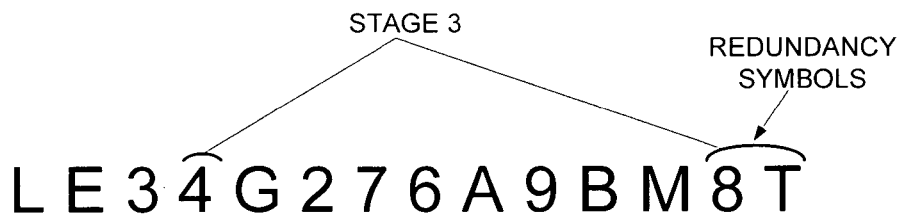

FIGS. 5A-5C illustrate another embodiment of the present invention wherein the encoded serial number is written to the wafer over multiple stages using a plurality of masks. This embodiment reduces cost by reducing the number of masks required to write the serial numbers. In the embodiment of FIGS. 5A-5C, the first four characters of the serial number identify the wafer, and last four characters of the serial number represent a die location on the wafer (e.g., an individual disk drive head) which is the same from wafer to wafer. The first two characters of the wafer number are written together with the die location number during the first stage (FIG. 5A). This requires a corresponding number of masks (having appended redundancy characters) for generating the first two characters of the wafer number and the four characters of the die location number. The third character of the wafer number and appended redundancy characters are written using a separate mask during a second stage (FIG. 5B), and the fourth character of the wafer number and appended redundancy characters are written using a separate mask during a third stage (FIG. 5C).

The redundancy characters are generated by encoding the partial serial number using the error correction code to form individual codewords. During the detection process, the detected serial number comprises a plurality of corresponding codewords that are decoded individually by generating the error syndromes for each individual codeword. In FIG. 5A, the first codeword comprises the $1^{st}$-$2^{nd}$ detected characters (of the wafer number), the $4^{th}$-$8^{th}$ detected characters (the die location number), and the $9^{th}$-$10^{th}$ detected characters (the corresponding redundancy characters). In FIG. 5B, the second codeword comprises the $3^{rd}$ detected character (of the wafer number) and the $11^{th}$-$12^{th}$ detected characters (the corresponding redundancy characters). In FIG. 5C, the third codeword comprises the $4^{th}$ detected character (of the wafer number) and the $13^{th}$-$14^{th}$ detected characters (the corresponding redundancy characters). Each codeword comprises two redundancy characters enabling the correction of one character without erasure pointers and two characters with erasure pointers.

Figure 6:
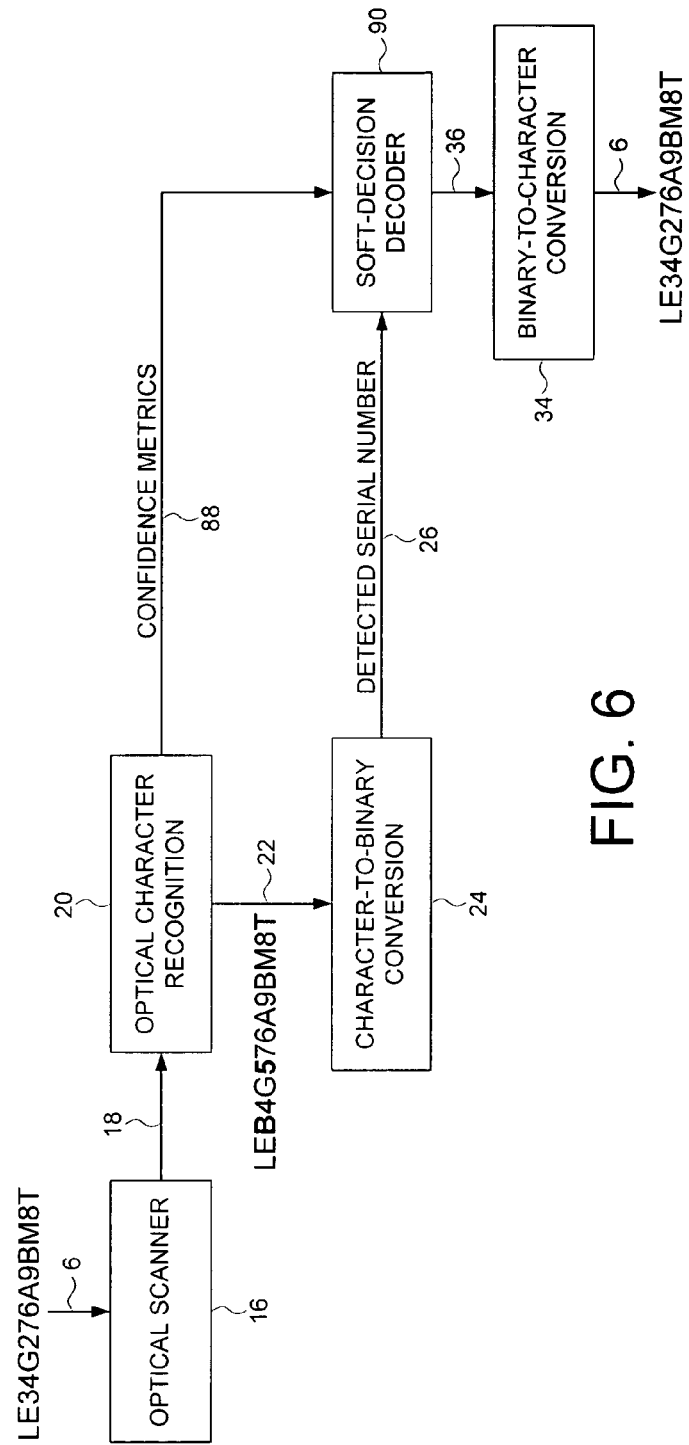
FIG. 6 shows an embodiment of the present invention wherein the OCR system outputs a confidence metric for each detected character and a soft-decision decoder corrects the detected serial number using a soft-decision decoding algorithm.

FIG. 6 shows an alternative embodiment of the present invention wherein the OCR system 20 outputs a confidence metric 88 for each detected character 26 and a soft-decision decoder 90 corrects the detected serial number 26 using a soft-decision decoding algorithm. In the neural network example of FIG. 4B, the maximum confidence metric selected by selector 84 is output as the confidence metric 88 for processing by the soft-decision-decoder 90. Any suitable soft-decision decoder 90 may be employed, such as disclosed in J. K. Wolf, "Efficient Maximum Likelihood Decoding of Linear Block Codes Using a Trellis," IEEE Transactions on Information Theory, pp. 76-80, January 1978; or D. Chase, "A Class of Algorithms for Decoding Block Codes with Channel Measurement Information," IEEE Transactions on Information Theory, pp. 170-181, January 1972.

We claim:

1. A method of writing a serial number on a wafer, the serial number comprising a plurality of data characters and a plurality of redundancy characters, the method comprising:
    during a first stage, writing a first subset of the data characters together with a first subset of the redundancy characters on the wafer; and
    during a second stage after the first stage, writing a second subset of the data characters together with a second subset of the redundancy characters on the wafer.

2. The method as recited in claim 1, further comprising:
    writing a first subset of the data characters together with the first subset of the redundancy characters on the wafer using a first mask; and
    writing the second subset of the data characters together with the second subset of the redundancy characters on the wafer using a second mask.

3. The method as recited in claim 1, wherein:
    the first subset of the data characters together with the first subset of the redundancy characters form a first codeword of an error correction code; and
    the second subset of the data characters together with the second subset of the redundancy characters form a second codeword of the error correction code.

4. A serial number writer operable to write a serial number on a wafer, the serial number comprising a plurality of data characters and a plurality of redundancy characters, the serial number writer comprising control circuitry operable to:
    during a first stage, write a first subset of the data characters together with a first subset of the redundancy characters on the wafer; and
    during a second stage after the first stage, write a second subset of the data characters together with a second subset of the redundancy characters on the wafer.

5. The serial number writer as recited in claim 4, wherein the control circuitry is further operable to:
    write a first subset of the data characters together with the first subset of the redundancy characters on the wafer using a first mask; and
    write the second subset of the data characters together with the second subset of the redundancy characters on the wafer using a second mask.

6. The serial number writer as recited in claim 4, wherein:
    the first subset of the data characters together with the first subset of the redundancy characters form a first codeword of an error correction code; and
    the second subset of the data characters together with the second subset of the redundancy characters form a second codeword of the error correction code.

* * * * *